US010572493B2

(12) United States Patent
Trenchard et al.

(10) Patent No.: US 10,572,493 B2
(45) Date of Patent: Feb. 25, 2020

(54) COMPUTERIZED PROCESS SAFETY MANAGEMENT SYSTEM

(71) Applicant: Honeywell International Inc., Morristown, NJ (US)

(72) Inventors: Andrew John Trenchard, Romsey (GB); Meenakshi Sundaram, Edmonton (CA)

(73) Assignee: Honeywell International Inc., Morris Plains, NJ (US)

( * ) Notice: Subject to any disclaimer, the term of this patent is extended or adjusted under 35 U.S.C. 154(b) by 674 days.

(21) Appl. No.: 14/734,908

(22) Filed: Jun. 9, 2015

(65) Prior Publication Data
US 2016/0364456 A1    Dec. 15, 2016

(51) Int. Cl.
G06F 16/2458    (2019.01)
G06F 16/2455    (2019.01)
G06Q 10/06      (2012.01)
G06Q 50/26      (2012.01)

(52) U.S. Cl.
CPC ...... G06F 16/2465 (2019.01); G06F 16/2455 (2019.01); G06Q 10/0635 (2013.01); G06Q 50/26 (2013.01)

(58) Field of Classification Search
CPC ......... G06F 17/30539; G06F 17/30477; G06F 16/2465; G06F 16/2455; Y02P 90/02; G06Q 10/0635; G06Q 50/26
USPC ......................................... 707/705, 722, 776
See application file for complete search history.

(56) References Cited

U.S. PATENT DOCUMENTS 7,082,384 B2    7/2006 Sasaki et al.
8,639,646 B1*   1/2014 Presgraves ......... G05B 23/0283
                                                    700/21
2006/0020604 A1   1/2006 Murez et al.
(Continued)

FOREIGN PATENT DOCUMENTS

JP    2005-182465 A    7/2005

OTHER PUBLICATIONS

International Searching Authority, "Notification of Transmittal of the International Search Report and the Written Opinion of the International Searching Authority, or the Declaration," International Application No. PCT/US2016/034940, dated Sep. 20, 2016, 5 pages, publisher International Application Division Korean Intellectual Property Office, Daejeon, Republic of Korea.

(Continued)

Primary Examiner — Hares Jami

(57) ABSTRACT

A method includes obtaining from a database: at least one initiating cause that causes a hazard, an initiating cause frequency corresponding to the at least one initiating cause, a set of independent protection layers configured to operate to prevent the hazard and including protection equipment for which no industry safety standards and regulations are defined, and a failure probability of each protection layer. The method includes estimating a frequency of occurrence of the hazard using a product of the initiating cause frequency and a failure probability of the set of independent protection layers. The method further includes adjusting the estimated frequency of occurrence of the hazard based on a change of at least one of: the initiating cause frequency, and a failure probability of a protection layer in the set of independent protection layers.

20 Claims, 4 Drawing Sheets

(56) References Cited

U.S. PATENT DOCUMENTS

| | | | |
|---|---|---|---|
| 2007/0150772 A1* | 6/2007 | Berenbach | G06F 11/2257 |
| | | | 714/25 |
| 2009/0012631 A1 | 1/2009 | Fuller | |
| 2009/0138306 A1* | 5/2009 | Coburn | G06Q 10/00 |
| | | | 705/7.28 |
| 2012/0101953 A1 | 4/2012 | James et al. | |
| 2015/0081379 A1* | 3/2015 | Fisher | G06Q 10/06 |
| | | | 705/7.28 |

OTHER PUBLICATIONS

International Searching Authority, "Written Opinion of the International Searching Authority," International Application No. PCT/US2016/034940, dated Sep. 20, 2016, 5 pages, publisher International Application Division Korean Intellectual Property Office, Daejeon, Republic of Korea.

Ankur Pariyani, et al., "Dynamic Risk Analysis Using Alarm Databases to Improve Proces Safety and Product Quality: Part I—Data Compaction". 2011 American Institute of Chemical Engineers, vol. 00, No. 0, May 16, 2011, 14 pages.

Anton A. Frederickson, "The Layer of Protection Analysis (LOPA) method", www.safetyusergroup.com, Apr. 1, 2002, 9 pages.

* cited by examiner

COMPUTERIZED PROCESS SAFETY MANAGEMENT SYSTEM

TECHNICAL FIELD

This disclosure is generally directed to industrial process control and automation. More specifically, this disclosure is directed to an apparatus and method for computerized process safety management system that operates an industrial plant using a safety case incorporating a safety design analysis.

BACKGROUND

There are many regulations governing the safe operation of a hazardous process plant. A key part of the regulatory strategy is to ensure that operating companies take reasonable steps to formally analyze the risks to safety and take measures to reduce the risks to a very low level. For example, certain regulations require risks to human health to be quantified in terms of Fatal Accident Rate (FAR) which is measured in terms of the number of fatalities occurring during 1000 working lifetimes, approximated to $10^8$ operating hours.

Standards and guidelines exist to support risk analysis and quantification. The International Electrotechnical Commission (IEC) 61508 is an international standard of rules intended to be a basic functional safety standard applicable to various industries. The IEC 61508 is titled Functional Safety of Electrical/Electronic/Programmable Electronic Safety-related Systems (E/E/PE, or E/E/PES). Additionally, the IEC 61511 is a specialization of IEC 61508, applicable to the process industry sector (not including the nuclear industry). IEC 61511 focuses attention on one type of instrumented safety system used within the process sector, namely the Safety Instrumented System (SIS) which is pervasive, but the standard does not provide requirements for other protective systems. The IEC 61511 standard provides a method of risk quantification, called the Layer of Protection Analysis (LOPA) method, that is used in the industry. Other examples of risk quantification methods include a Process Hazard Analysis (PHA) method or Quantitative Risk Assessment (QRA) method.

SUMMARY

This disclosure provides an apparatus and method for a computerized process safety management system that operates an industrial plant using a safety case incorporating a safety design analysis.

In a first example, a method includes obtaining from a database: at least one initiating cause that causes a hazard, an initiating cause frequency corresponding to the at least one initiating cause, a set of independent protection layers configured to operate to prevent the hazard and including protection equipment for which no industry safety standards and regulations are defined, and a failure probability of each protection layer. The method also includes estimating a frequency of occurrence of the hazard using a product of the initiating cause frequency and a failure probability of the set of independent protection layers. The method further includes adjusting the estimated frequency of occurrence of the hazard based on a change of at least one of: the initiating cause frequency, and a failure probability of a protection layer in the set of independent protection layers.

In a second example, an apparatus includes processing circuitry configured to obtain from a database: at least one initiating cause that causes a hazard, an initiating cause frequency corresponding to the at least one initiating cause, a set of independent protection layers configured to operate to prevent the hazard and including protection equipment for which no industry safety standards and regulations are defined, and a failure probability of each protection layer. The processing circuitry is also configured to estimate a frequency of occurrence of the hazard using a product of the initiating cause frequency and a failure probability of the set of independent protection layers. The processing circuitry is also configured to adjust the estimated frequency of occurrence of the hazard based on a change of at least one of: the initiating cause frequency, and a failure probability of a protection layer in the set of independent protection layers.

In a third example, a non-transitory computer readable medium embodying a computer program is provided. The computer program includes a computer readable program code that, when executed by processing circuitry, causes the processing circuitry to obtain from a database: at least one initiating cause that causes a hazard, an initiating cause frequency corresponding to the at least one initiating cause, a set of independent protection layers configured to operate to prevent the hazard and including protection equipment for which no industry safety standards and regulations are defined, and a failure probability of each protection layer. The computer program includes a computer readable program code that, when executed by processing circuitry, causes the processing circuitry to estimate a frequency of occurrence of the hazard using a product of the initiating cause frequency and a failure probability of the set of independent protection layers. Also, the computer program includes a computer readable program code that, when executed by processing circuitry, causes the processing circuitry to adjust the estimated frequency of occurrence of the hazard based on a change of at least one of: the initiating cause frequency, and a failure probability of a protection layer in the set of independent protection layers.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 4, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
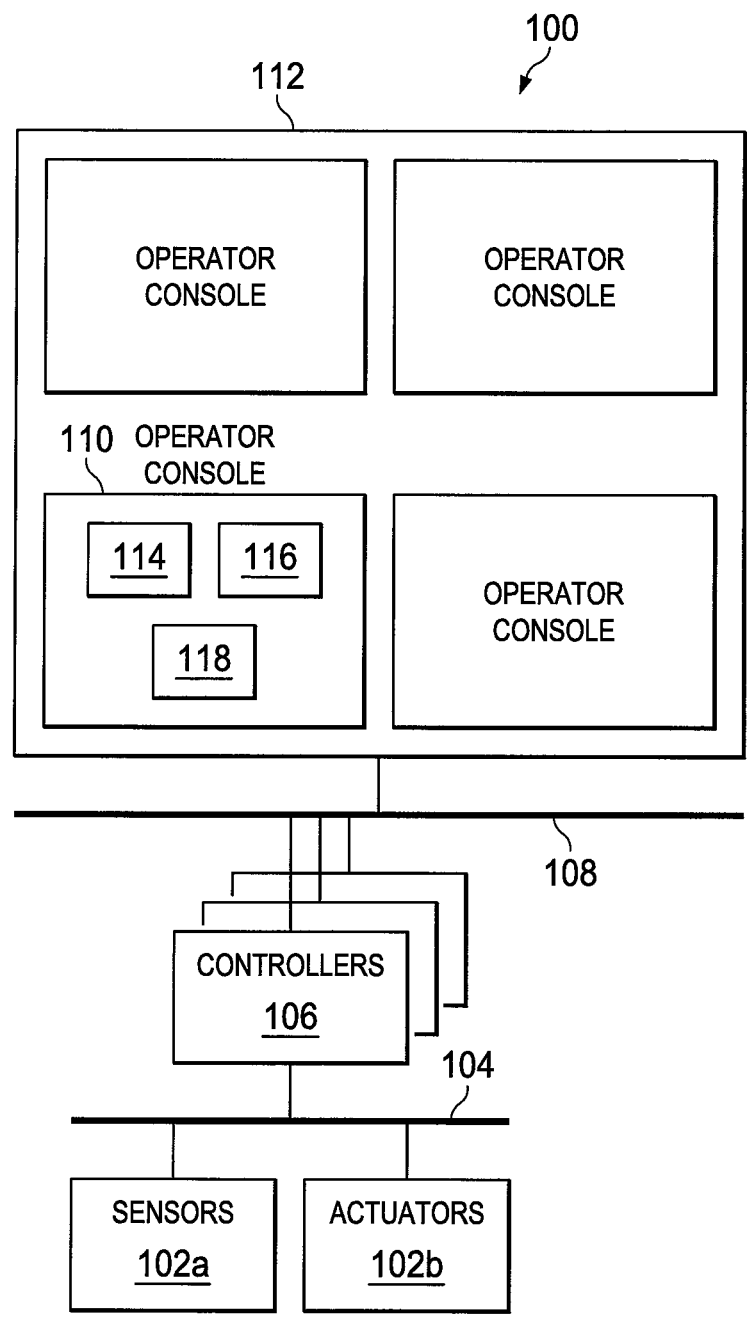
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof). Example processing facilities include manufacturing plants for producing at least one product or other material, chemical plants, crude oil refineries, ore processing plants, and paper or pulp manufacturing and processing plants. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system. Example actuators 102b include heaters, motors (for example, variable speed motors), or valves.

At least one network 104 is coupled to the sensors 102a and actuators 102b. The network 104 facilitates interaction with the sensors 102a, actuators 102b, and controllers 106. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART or FOUNDATION FIELDBUS network), pneumatic control signal network, or any other or additional type(s) of network(s).

Various controllers 106 are coupled directly or indirectly to the network 104. The controllers 106 can be used in the system 100 to perform various functions. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent multivariable controllers, such as Robust Multivariable Predictive Control Technology (RMPCT) controllers or other type of controllers implementing model predictive control (MPC) or other advanced predictive control (APC).

Operator access to and interaction with the controllers 106 and other components of the system 100 can occur via various operator consoles 110. As described above, each operator console 110 could be used to provide information to an operator and receive information from an operator. For example, each operator console 110 could provide information identifying a current state of an industrial process to the operator, including warnings, alarms, or other states associated with the industrial process. Each operator console 110 could also receive information affecting how the industrial process is controlled, such as by receiving set points for process variables controlled by the controllers 106 or by receiving other information that alters or affects how the controllers 106 control the industrial process.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

Each operator console 110 includes any suitable structure for displaying information to and interacting with an operator. For example, each operator console 110 could include one or more processing devices 114, such as one or more processors, microprocessors, microcontrollers, field programmable gate arrays, application specific integrated circuits, discrete logic devices, or other processing or control devices. Each operator console 110 could also include one or more memories 116 storing instructions and data used, generated, or collected by the processing device(s) 114. Each operator console 110 could further include one or more network interfaces 118 that facilitate communication over at least one wired or wireless network, such as one or more Ethernet interfaces or wireless transceivers.

Operators are typically responsible for managing industrial processes and often need to act quickly and efficiently to maintain safe and profitable operations. To do this, operators orient themselves to the current state of an industrial process, evaluate whether the current state requires human intervention, and (if so) perform the interventions and assess the outcomes of the interventions. Each operator console 110 supporting these functions could further include one or more display screens and one or more keyboards and pointing devices, such as mice or trackballs. The display screen could represent a screen of any suitable display device, such as a liquid crystal display (LCD), cathode ray tube (CRT) display, or light emitting diode (LED) display.

Fires, explosions, and toxic emissions are examples of hazards associated with industrial plant processing facilities can endanger the site employees, surrounding communities, and the environment. Such hazards can also have a significant economic impact because of equipment damage, lost operation, and litigation. Based on these hazards, it is necessary to manage safety as part of the plant design and operation. During the design phase, techniques such as hazard and operability studies (HAZOP), Fault Tree Analysis, Failure Mode and Effects Analysis (FMEA) and Layer of Protection Analysis (LOPA) are used to identify potential hazards and how to reduce the identified hazards to a level that society deems acceptable. Then, the safety design analysis used as part of the safety case to operate the process plant.

In accordance with this disclosure, system 100 includes a computerized process safety management system that operates an industrial plant using a safety case incorporating a safety design analysis. As a particular example, the computerized process safety management system leverages a Layer of Protection Analysis (LOPA) that forms the basis of the industrial plant safety case. The LOPA describes a number of hazardous event scenarios for the plant such as fires, explosions and emissions and the independent layers of protection designed to mitigate risk. That is, the LOPA identifies a set of potential plant hazards; and for each of the potential plant hazards, identifies one or more hazardous event scenarios concluding with the identified hazard. For each scenario, the LOPA describes an initiating fault event and corresponding assumed frequency, all of the associated independent layers of protection and corresponding assumed probability of failure on demand (Pfd), and the consequences of the scenario (or impact event). The computerized process safety management system includes a database for storing the design LOPA as a set of scenarios. As described more particularly with reference to FIG. 2, the computerized process safety management system estimates the frequency of each scenario and the total hazard rate using design LOPA information and updated LOPA information.

Safety management is not only important during the design phase, but also during plant operation. The computerized process safety management system in accordance with this disclosure enables operating companies to ensure that they operate the plant safely by complying with the safety case and periodically reviewing and updating the safety case. For certain specific items of protection equipment, such as the safety instrument systems, there are well defined standards and regulations to ensure compliance with the safety case, such as International Electrotechnical Commission (IEC) 61511, but these are generally limited to the Safety Instrumented Level (SIL) rated systems. The industrial plant includes critical components of the industrial process system that are protected by other items of protection equipment, such as non-SIL rated systems. For these other items of protection equipment, the IEC 65111 standard does not include such critical components in the safety case, and there are no industry defined standards or regulations for monitoring on-going compliance of such critical components if included in the safety case. As the IEC 61511 standard does not provide requirements for other instrumented safety systems, such as fire and gas systems, safety alarms, or safety controls, conventional safety case layers of protection, such as those that merely comply with the IEC 61511 standard, do not incorporate these other items of protection equipment. In accordance with this disclosure, the independent layers include both (1) protection equipment for which there are well defined standards and regulations to ensure compliance with the safety case, and (ii) protection equipment for which there are no industry defined standards or regulations to include such critical components in the safety case. In a specific non-limiting example, the independent layers include both (1) protection equipment for which there are well defined standards and regulations to ensure compliance with the safety case, and (ii) protection equipment that is not covered by IEC 61511 standard. The focus of surveillance includes all of the independent protection layers considered as part of the LOPA, including, fire and gas systems, safety alarms, and safety controls, not just the SIL rated safety instrumented function.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment for monitoring the process safety relative to the design basis including all the associated independent protection mechanisms. FIG. 1 does not limit this disclosure to any particular configuration or operational environment.

Figure 2:
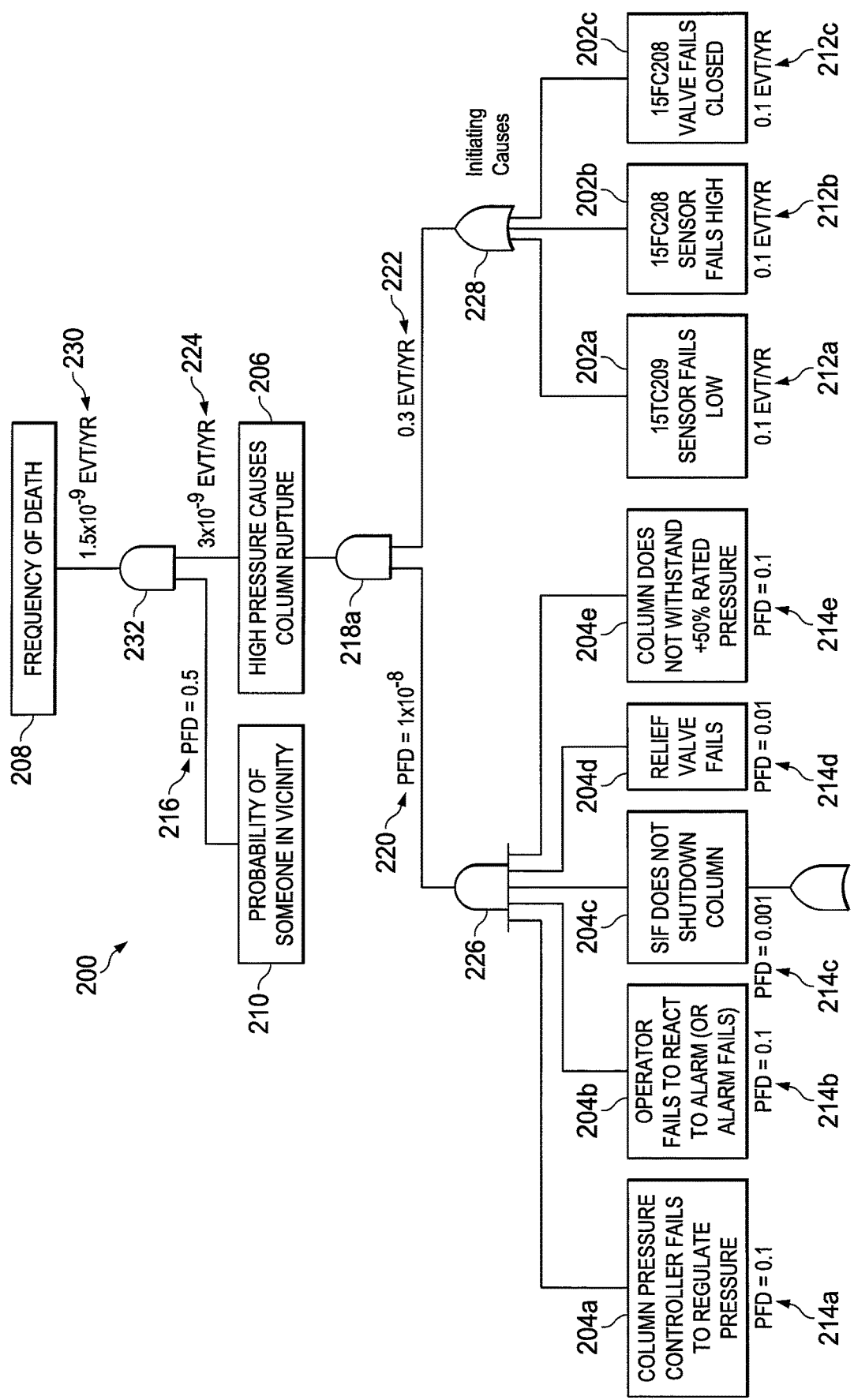
FIG. 2 illustrates an example Layer of Protection Analysis (LOPA) scenario in a fault tree form according to this disclosure.

FIG. 2 illustrates an example Layer of Protection Analysis (LOPA) scenario 200 in a fault tree form according to this disclosure. The embodiment of the LOPA scenario 200 shown in FIG. 2 is for illustration only. Other embodiments could be used without departing from the scope of the present disclosure. For ease of explanation, the LOPA scenario 200 is described with respect to the system 100 of FIG. 1.

A computerized process safety management system includes the LOPA scenario 200, which includes a set of initiating causes 202a-202c, a set of independent layers of protection 204a-204e, a hazard 206 (also referred to as a hazardous event), and a consequence 208. The consequence 208 at the root of the fault tree represents a harm or damage that results from a person or property in the vicinity during the hazard 206. The middle portion of the fault tree includes a node 210 representing the probability of a person being present in the vicinity of the potential hazard, and a node representing the occurrence of the hazard 206. The upper portion of the fault tree includes nodes on one side that represent each initiating cause 202a-202c of the hazard 206, such as a fault of a sensor 102a or actuator 102b, and nodes on another side that represent each independent layer of protection 204a-204e for reducing the risk of the occurrence of the hazard 206.

The LOPA scenario 200 can be displayed on a display screen of an operator console 110 to enable an operator to see potential hazards and the level or risk associated with sensors 102a, actuators 102b, and corresponding independent layer of protection 204a-204e. The computerized process safety management system receives and uses design LOPA information to perform calculations. From design LOPA information, the computerized process safety management system estimates the frequency of each scenario from the product of the initiating cause frequency and the failure probability of a set of independent protection layers configured to operate to prevent the scenario. The failure probability of the set of independent protection layers is the product of the failure probabilities of all the independent protection layers in the set. The computerized process safety management system also calculates the total hazard rate of the industrial plant as the sum of the frequencies of all the scenarios. The design LOPA information includes design values for the initiating cause frequency 212a-212c corresponding to each initiating cause, for the probability of failure on demand 214a-214e corresponding to each independent protection layer, and for the probability 216 of a person being present in the vicinity of the potential hazard. In certain embodiments, the node 210 represents a failure of a protection device (e.g., an automatic locking door) for preventing a person from accessing a hazard or a potential hazard, and the probability 216 represents the Pfd of that automatic locking door to timely lock. In other embodiments, the node 210 represents the probability of someone being in the proximity of the hazardous equipment as detected by a system for detecting the presence of a person, for example, a video camera and video image processing analytics or other geolocation technology for detecting presence of a person in a surveillance space.

The computerized process safety management system includes a LOPA structure in the form of a logical circuit that calculates the frequency of occurrence of the hazard 206 using the design LOPA information as inputs. The LOPA structure includes an AND gate 218a for multiplying the failure probability 220 of the set of independent protection layers 204a-204e by the frequency 222 of the set of initiating causes. The output of the AND gate 218a represents the frequency 224 of occurrence of the hazard 206. In the case wherein the set of independent protection layers includes multiple independent layers, the LOPA structure includes an AND gate 226 for multiplying the failure probabilities 214a-214e of each protection layer in the set of independent protection layers 204a-204e. In the case where the set of initiating causes of the hazard 206 includes multiple initiating causes 202a-202c that are protected by the same set of protection layers 204a-204e, the LOPA structure includes an OR gate 228 for summing the initiating cause frequencies 212a-212c corresponding to each initiating cause 202a-202c in the set of multiple initiating causes. As a comparison, the OR gate 228 represents that the hazard 206 can occur as result of any one of the initiating causes 212a-212c, yet the AND gate 226 represents that the hazard 206 occurs as a result of failure of all in the set of the independent protection layers 204a-204e.

In certain embodiments, the output of the LOPA structure is the frequency 224 of occurrence of the hazard 206 outputted from the AND gate 218a. In such embodiments, the LOPA scenario refers to the scenario in which occurrence of the hazard 206 is the conclusion. In other embodiments, the output of the LOPA structure is the frequency 230 of occurrence of the consequence 208 outputted from the AND gate 232, such as a fatal accident rate. In such embodiments, the LOPA scenario refers to the scenario in which the conclusion is the occurrence of damage/harm 208 from the hazard 206.

The computerized process safety management system includes circuitry for calculating the total hazard rate as the sum of the frequencies of all the scenarios. For example, when the safety case includes a single hazard 206, then the outputted frequency 224 of occurrence of the hazard from the LOPA structure represents the total hazard rate. More particularly, the computerized process safety management system includes a LOPA structure for each hazardous event scenario identified during the design phase. For example, the computerized process safety management system can include first and second LOPA structures in the form of logical circuits that calculate the frequency of occurrence of a first hazard (such as hazard 206) and the frequency of occurrence of a second hazard different from the first hazard. Further in this example, the output of an OR gate can represent the total hazard rate, wherein the outputs from the first and second LOPA structures are inputted to the OR gate.

The computerized process safety management system can estimate the frequency of each scenario and the total hazard rate using not only design LOPA information, but also updated LOPA information. The current safety status of the operating plant is represented by an identical LOPA structure for each scenario, but using dynamically estimated and dynamically updated numerical values for the probabilities 214a-e, 216 of failure on demand and initiating cause frequencies 212a-212c, 224 of failure. The revised estimates are base-lined at the design LOPA values (i.e., the revised estimates cannot be lower than the design LOPA values) but can be higher based on plant status information and equipment health monitoring applications. Using a calculation engine, such as an equipment health monitoring system for monitoring performance and health of control system assets, the frequency of occurrence of each scenario can be evaluated identically to the design LOPA. As specific example, Asset Manager, provided by HONEYWELL, is an equipment health monitoring system for monitoring performance and health of control system assets. The ratio of the frequency of failure or failure probability at any point in the dynamically updated LOPA relative to the design LOPA represents an elevation in plant operating risk. The computerized process safety management system can be deployed in a real-time context with minute by minute dynamic updating to support abnormal situation management as well as for week to week, month to month monitoring of trends in plant risk levels.

As safety management is important during plant operation, the computerized process safety management system provides the system framework and process to review and update the design LOPAs based on historical evidence and analysis of safety incidents. The computerized process safety management system can compute the elevated risk based on real-time information, for example, as a safety incident is developing and presented to an operator through a user interface to aid decision making. For example, the computerized process safety management system can present real-time elevated risk through interface in the form of status information, key performance indicators (KPIs), visual queues and alerts regarding process sensors, shutoff valves, relief valves, process control loops, process control valves, safety alarms, and other physical plant equipment. That is, real-time monitoring and dynamically updating is not limited to using information from equipment items that are considered part of the safety system, but also uses non-safety related information (for example, sensor information or information process alarms set at a lower trip point. The computerized process safety management system can also compute the elevated risk using time averaged information to determine trends in the level of plant risk relative to the design LOPA and presented to an operations or safety manager. Time averaged information can be obtained from equipment health information from a regulatory process control monitoring system such as Loop Scout, or Control Performance Monitor (CPM) can be used to compute elevated plant risk. Information from the regulatory process control monitoring system or CPM can be aggregated together with alarm health information and safety instrumented system health to assess the overall plant risk, leveraging existing plant knowledge beyond information of the design LOPA.

Figure 3:
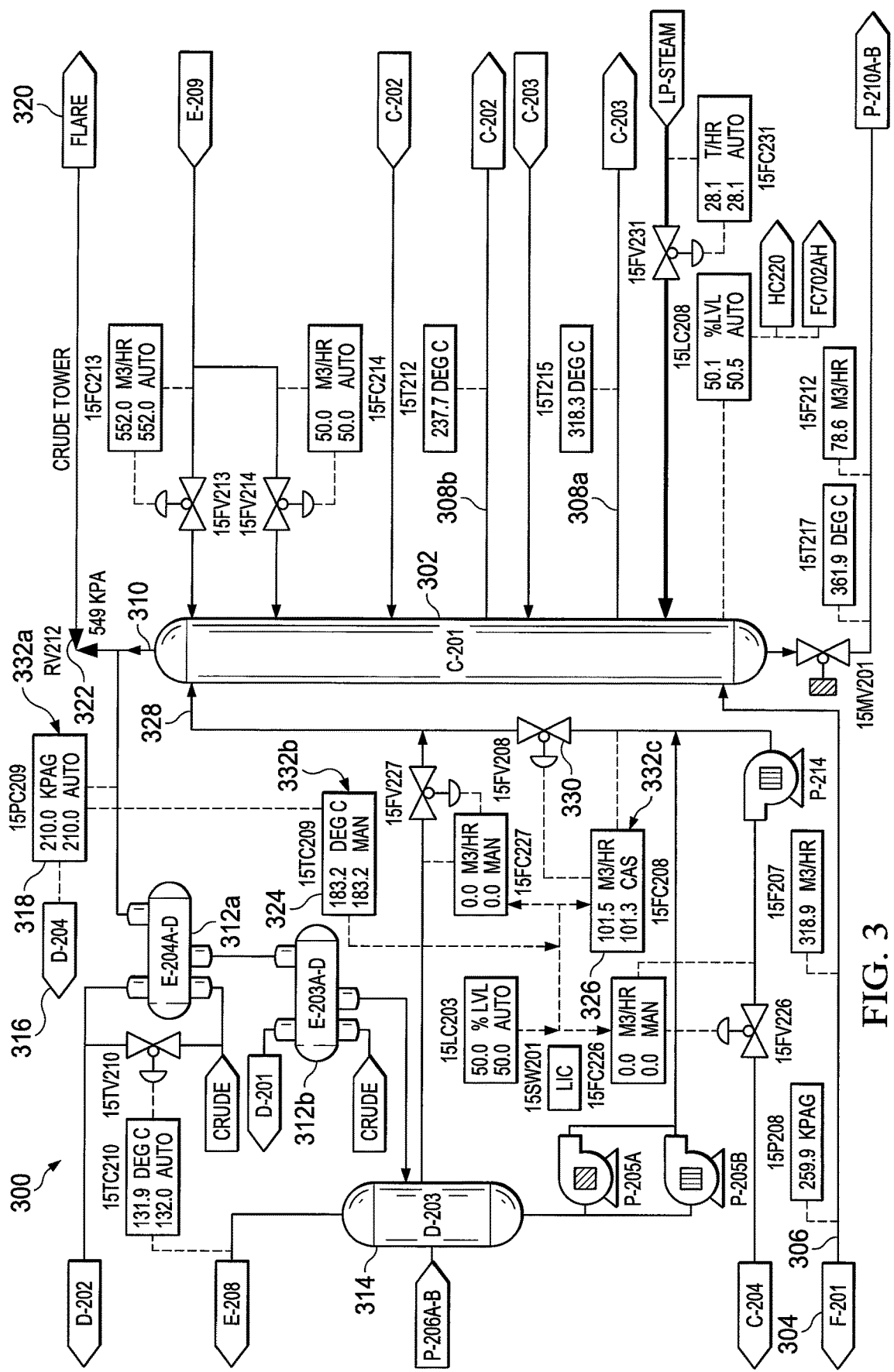
FIG. 3 illustrates an example schematic of a crude oil distillation unit for a refinery plant according to this disclosure.

FIG. 3 illustrates an example schematic of a crude oil distillation unit 300 for a refinery plant according to this disclosure. The schematic can be displayed on a display screen of an operator console 110 or a user interface such as an asset manager heat map display. The crude oil distillation unit 300 can represent a process system in the industrial process control and automation system 100 of FIG. 1. The computerized process safety management system can be applied to assess the level of plant risk in the crude oil distillation unit 300. There are many LOPA scenarios for the refinery plant. One particular illustrative LOPA scenario for the crude oil distillation unit 300 is a rupture of a crude tower 302 (also referred to as "crude unit column" or "crude fractionator") or associated pipe work leading to a release of hydrocarbon resulting in a major fire or explosion, which is represented by the LOPA scenario in FIG. 2.

The crude oil distillation unit 300 implements a crude oil fractionization process in which crude oil, partially vaporized by a furnace 304, enters the crude tower 302 from a feed pipe 306. The liquid portion of the partially vaporized crude oil flows down over trays and is steam stripped before leaving the base of the crude tower 302. The vapor portion of the partially vaporized crude oil rises up through column trays contacting the down-flowing liquid portion, thereby causing the lighter molecules from the liquid portion to be exchanged with the heaver molecules in the vapor stream. Two liquid sidestreams 308a-308b, kerosene and gasoil, are drawn out from the crude tower 302. The balance of the crude oil leaves the crude tower 302 as vapor through the release pipe 310 at the top of the tower. The overhead vapor from the crude tower 302 is first cooled and partially condensed against the feed crude oil liquid in heat exchangers 312a-312b to improve the energy efficiency of the unit, before entering vessel 314. Some of the condensed naphtha liquid is returned to the crude tower 302 as external reflux in order to regulate the column top temperature and the balance flow to vessel 316. The overhead vapor from the vessel 314 is routed to some air fin fan coolers, and the resulting liquid also flows to vessel 316. The liquid level in the vessel 316 is controlled by adjusting the flow of naphtha product. A split range pressure controller 318 controls the pressure in the crude tower 302. That is, the split range pressure controller 318 either vents the non-condensing vapor from the vessel 316 to flare 320 or imports fuel gas. Additionally, the release pipe 310 is coupled to a pressure relief valve 322 that functions as a spring and piston such that when the vapor pressure from the crude tower 302 reaches a high threshold level (for example, lifting pressure 549 kPA), the vapor flows to the flare 320 to be burned harmlessly; otherwise, the vapor flows to the heat exchangers 312a-312b. The crude tower 302 operates at high flow rates and high temperatures, and a loss of external reflux to the top of the crude tower 302 would cause the system pressure to rise, which if unchecked by the control loops and pressure relief valves, could lead to an over pressure condition. An over pressure in the crude tower 302 could lead to a column rupture, which could lead to a major fire when the hydrocarbon vapors and liquid ignite.

A number of different faults (i.e., initiating causes) can cause pressure to build up in the crude tower 302. For the purposes of this example, three initiating causes have been identified that can cause an over pressure in the crude tower 302. Each of these three example initiating causes are described below.

In one initiating cause example, the crude tower top temperature sensor within the temperature controller 324 fails low, which causes the external reflux flowrate to be driven to zero. This temperature sensor fault is represented by the first initiating cause 202a in the LOPA scenario 200. In response to a temperature sensor within the temperature controller 324 failing low, the temperature controller 324 reacts as though the vapor released from release pipe 310 is too cold and instructs the crude oil distillation unit 300 to increase the heat within the crude tower 302. Specifically, the temperature controller 324 instructs the flow controller 326 to reduce the reflux flow flowing through the coolant pipe 328 into the top of the crude tower 302. The flow controller 326 controls the opening and closing of a flow valve 330. The flow valve 330 opens to allow coolant into the crude tower 302 for cooling, and flow valve 330 closes to prevent coolant from entering the coolant pipe 328 and crude tower 302 for heating. Accordingly, when the flow valve 330 closes, the external reflux flowrate through the coolant pipe 328 is driven to zero.

In another initiating cause example, the external reflux flow sensor fails high, which causes the actual reflux flow to be driven to zero. This flowrate sensor fault is represented by the second initiating cause 202b in the LOPA scenario 200. In response to flowrate sensor within the flow controller 326 failing high, the flowrate controller 326 reacts as though the flow rate through the coolant pipe 328 is too high and reduces the reflux flow flowing through the coolant pipe 328. Reducing the reflux flow can include closing the flow valve 330 to drive the reflux flow to zero.

In the third initiating cause example, the reflux flow control valve fails closed, driving the actual reflux flow to zero. This valve fault is represented by the third initiating cause 202c in the LOPA scenario 200. Though the flowrate controller 326 can control the flow valve 330, additionally, the flow valve 330 can close itself, which causes a loss of coolant material returning to the crude tower 302.

If any of these three faults occurs, then the column top pressure will start to rise. However, as a first layer of protection, if the column overhead pressure controller 318 is functioning correctly to regulate the pressure, then the problem will be mitigated. A failure of the pressure controller 318 is the first prerequisite for the propagation of the process hazard 206, as represented by the first layer of protection 204a in the LOPA scenario 200 having a 10% design probability of failure on demand 214a (Pfd=0.1). If fault persists then the pressure will increase to the point where an alarm annunciates indicating the pressure has reached an alarm limit and the operator will receive the high pressure alarm. Again, the second layer of protection implemented as the alarm annunciation should be sufficient to trigger corrective action from the operator. A failure of the alarm to annunciate or a failure of the operator to respond to the alarm is the second condition for the propagation of the process hazard 206, as represented by the second layer of protection 204b in the LOPA scenario 200 having a 10% design probability of failure on demand 214b (Pfd=0.1). As the pressure continues to build the amount of pressure will reach the trip point for the Safety Instrumented Functions (SIF) safety shutdown system, which in turn should cause the plant to shutdown safely. A failure of the trip of the safety instrumented system is the third condition for the propagation of the process hazard 206, as represented by the third layer of protection 204c in the LOPA scenario 200 having a 0.10% design probability of failure on demand 214c (Pfd=0.001). The increasing pressure will eventually reach the relief valve lifting pressure, which again should contain the problem. A failure of the relief valve 322 is the fourth condition for the propagation of the process hazard 206, as represented by the fourth layer of protection 204d in the LOPA scenario 200 having a 1.0% design probability of failure on demand 214d (Pfd=0.01). Critical elements of the crude oil distillation unit 300, including the SIF safety shutdown system and relief valve 322, exhibit low probabilities of failure on demand of 1.0% or less. A failure of these critical elements of the later independent layers of protection could result in the process hazard 206, namely, the rupture of the crude tower 302 due to high pressure. The risk assessment assumes that there is a 50% chance of a fatality (represented by the probability 216 in FIG. 2) from a column rupture and ignition. Hence the event rate for the facility is $1.5 \times 10^{-9}$ events per year, or once per 5.4 million working lifetimes.

The computerized process safety management system uses deductive logic, shown in Table 1, to isolate the initiating cause to one or more potential root causes of a rupture of the crude tower 302. The computerized process safety management system uses current operating mode data to corroborate sensor measurement data. More particularly, the computerized process safety management system receives a real-time signal from each of the pressure, temperature, and flowrate controllers 318, 324, and 326 indicating its current operating mode 332a-332c. As shown, the pressure controller 318 indicates its automatic-operation mode 332a, the temperature controller 324 indicates its manual-operation mode 332b, and the flowrate controller 326 indicates its current operating mode 332c (CAS mode). The signal indicating the current operating mode can be a binary flag indicating a 0 value for and enabled automatic-operation and a 1 value for disabled. When a controller is in manual operating mode, the corresponding protective layer is ineffective. The computerized process safety management system further receives real-time temperature, pressure, and flowrate measurements from the respective controllers 318, 324, and 326. The computerized process safety management system determines whether the measurements are within a normal operating range as an indicator of whether the controllers 318, 324, and 326 (including corresponding sensors) are operating properly. When a controller fails to react to out of range sensor measurements, the corresponding protective layer is ineffective.

TABLE 1

Symptom Isolation Table

| | DCS Indicated Value | | | |
|---|---|---|---|---|
| Initiating Cause | 15TC209.PV | 15TC209.OP | 15FC208.PV | 15FC208.OP |
| 15TC209 sensor fails low | Low* | Low | Low | Low |
| 15FC208 sensor fails high | High | High | High* | Low |
| 17FC208 valve fails closed | High | High | Low | High |

*A false reading

Figure 4:
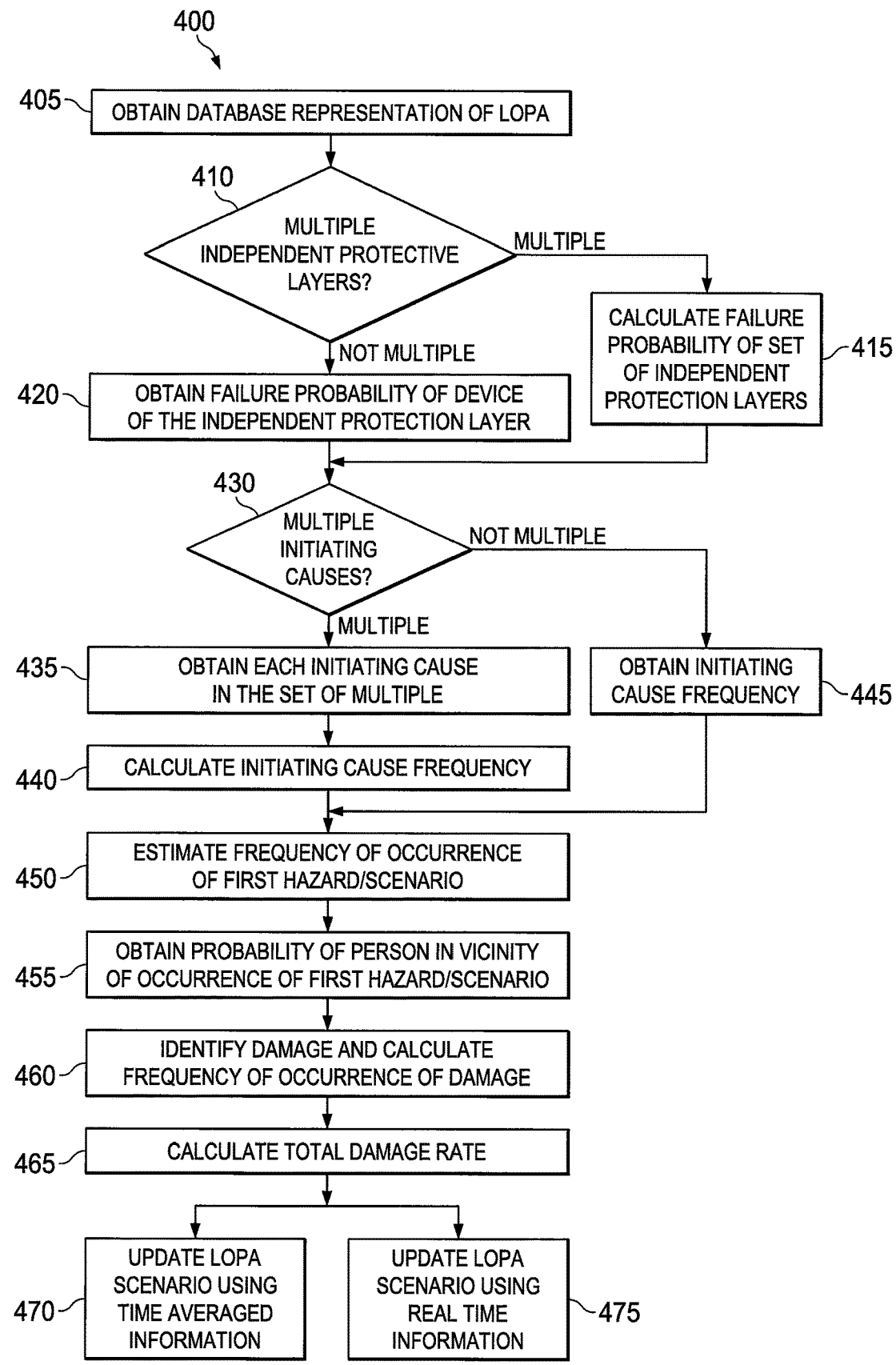
FIG. 4 illustrates a process for estimating a frequency of occurrence of a hazardous event scenario according to this disclosure.

FIG. 4 illustrates a method for estimating a frequency of the occurrence of a hazardous event scenario according to embodiments of the present disclosure. The embodiment of the method 400 shown in FIG. 4 is for illustration only. Other embodiments could be used without departing from the scope of this disclosure. The industrial process control and automation system 100 implements the method 400 using a computerized process safety management system. For ease of explanation, the method 400 will be described with reference to monitoring risk within the crude oil distillation unit 300 using the LOPA scenario in FIG. 2.

In block 405, the system 100 obtains a database representation of a LOPA for an industrial plant. For example, the system 100 accesses a historian or database to obtain a LOPA for the crude oil refinery plant, which includes at least one LOPA scenario, such as the LOPA scenario 200.

In block 410, the system 100 determines whether the set of independent protective layers in LOPA scenario 200 includes multiple independent layers. When the set of independent protective layers includes multiple independent protective layers 204a-204d, the method 400 proceeds to block 415. Alternatively, when the set of independent protective layers includes less than two independent protective layers, the method 400 proceeds to block 420.

In block 415, the system 100 determines or calculates the failure probability 220 of the set of independent protection layers. The system 100 may calculate the failure probability 220 of the set of independent protection layers using a product of the failure probabilities 214a-214e of the multiple independent protection layers 204a-204e. In this example, the failure probability 220 of the set of independent protection layers is $1.0 \times 10^{-8}$, which is the product of all the probabilities of failure 214a-214e ($0.1 \times 0.1 \times 0.001 \times 0.01 \times 0.1$) using the design LOPA information.

In block 420, the system obtains the failure probability of the device of the single independent protection layer. As the set of independent protection layers includes one protection layer, the design LOPA information includes one Pfd, which can be stored in a database instead of being calculated.

In block 430, the system 100 determines whether the LOPA scenario 200 includes multiple initiating causes. In response to a determination that the LOPA scenario 200 includes multiple scenarios 202a-202c in the set of initiating causes, the system 100 obtains each initiating cause from the database in block 435. As each initiating cause has a corresponding initiating cause frequency, the process proceeds to block 440 to calculate the initiating cause frequency of the set of initiating causes using a sum of the initiating cause frequencies 212a-212c corresponding to each initiating cause 202a-202c in the set of multiple initiating causes. In response to a determination that the set of initiating causes in the LOPA scenario includes less than two initiating causes, the process moves to block 445, wherein the system obtains the initiating cause frequency from the database instead of performing a calculation.

In block 450, the system 100 estimates the frequency 224 of occurrence of the hazardous event 206 using a product of the initiating cause frequency 222 and a failure probability 220 of the set of independent protection layers 204a-204e.

In block 455, the system 100 estimates the probability 216 of a person being in the vicinity of the crude tower 302. In this example, the risk assessment assumes that there is a 50% chance of a fatality, which is the probability 216 of a person being in the vicinity of the crude tower 302. The risk assessment is not limited to estimating a chance of fatality, and can also estimate the probability of certain property being in the vicinity of the hazard 206, in which case the probability 216 would represent the probability of that property being near the hazard 206.

In block 460, the system 100 calculates an amount of damage 208 that results from life or property being in the vicinity during the occurrence of a hazardous event scenario. That is, the system 100 calculates the frequency 230 of an occurrence of damage or harm 208 resulting from the occurrence of the hazardous event 206. The frequency 230 of an occurrence of damage/harm is $1.5 \times 10^{-9}$, namely, the product of the probability 216 of life/property being in the vicinity of the hazard 206 and the frequency 230 of occurrence of the hazard 206.

In block 465, the system 100 calculates a total hazard rate as the sum of the frequencies of all the LOPA scenarios. The system determines whether the LOPA for the industrial plant includes multiple hazards or potential hazardous event scenarios. For example, the when the system 100 determines that the LOPA scenario 200 is one of multiple LOPA scenarios associated with the crude oil refinery plant, then after the system 100 determining the frequencies 224 and 230 of occurrence of the first LOPA scenario 200, the method 400 repeats blocks 405 through block 460 to calculate the frequencies of occurrence of a hazard and its corresponding damage for each other LOPA scenario.

In block 470, the system 100 uses time averaged information of performance and state of the protection layers 204a-204e is used to adapt the design assumptions (Pfd$_{des}$) within the LOPA scenario 200 to include updated LOPA information. That is, periodically, such as weekly or monthly, the computerized process safety management system can adapt the design assumptions within the LOPA scenario 200 using the time averaged performance and state of the protective systems, which is information that can be analyzed off-line or in a non-real time case. For example, if the pressure controller 318 has a design probability 214a of failure on demand of 0.1 and is ineffective for 40% of the time (e.g., due to being switched to manual mode or the valve 322 being at fully open), then the probability 214a of failure is increased pro-rata as expressed by Equation 1 below. That is, the actual probability of failure on demand is 0.46 representing a 4.6 fold increase in overall risk from the design LOPA scenario. This increased risk information is displayed on a user interface (such as the asset manager heat map display or a display device of the operator console 110) and optionally alerted to the operations and safety manager.

$$Pfd_{actual} = \frac{X \times 1 + (1 - X) \times Pdf_{design}}{100} \quad (1)$$

In Equation 1, X represents the percentage of the time the device corresponding to the independent protective layer is estimated to be impaired (for example, X=40% for the pressure controller 318); Pfd$_{actual}$ represents the actual elevated probability of failure on demand of the device (e.g., pressure controller 318) based on the historical record of operating the refinery plant over longer periods of time such as months; and Pfd$_{design}$ represents the design probability of failure on demand of the device (e.g., shown by 214a in FIG. 2) based on the operating assumptions during the design phase of the refinery plant.

Equation 1 is also used to modify the probability of failure of the alarm system in the layer of protection 204b, safety shutdown system in the layer of protection 204c, and other protection systems. For the alarm system corresponding to layer of protection 204b, the percentage of time the alarm is impaired is estimated from: (1) the percentage of the time the alarm is disabled; (2) the percentage of time the alarm is annunciated and the deviation actually reaches the trip point (e.g., pressure sensor measurement is an alarm variable that rises above the alarm limit to the trip point of the SIF shutdown system); or (3) for less frequent alarms, a weighted function of how far the alarmed variable progresses from the alarm limit to the next critical limit (such as the trip or relief valve limit) for each alarm event.

Equation 1 can be used to revise the initiating cause frequency from the design frequency to an actual frequency, which can be estimated in one of two ways. First, if the event rate is sufficiently measurable (i.e., sufficiently frequent) then the maximum of the observed and design event rate can be used to estimate the increase in scenario event frequency and hence risk. For example, if the temperature sensor in the temperature controller 324 fails low twice in the course of three years, then the actual initiating cause frequency 212a has an event rate of 0.67 events per year as opposed to a design value of 0.1 events per year. Second, for less frequent events the design event rate is multiplied by a weighted function of the asset equipment health index, which is determined by algorithms of asset equipment health monitoring systems.

In block 475, the system 100 uses real-time, minute-by-minute information to modify the LOPA scenario 200 to include updated LOPA information. That is, in addition to the time-averaged updates to the design assumptions, the current observed state of the industrial process can be used to adapt the design assumptions of probability of failure. For example, if the pressure controller 324 is currently observed to be impaired (e.g., in Manual mode or the valve 322 is wide open) then the probability of failure 214a of the protective layer 204a is estimated to be unity. Similarly, as the value of an alarmed variable progress from its alarm limit to its next critical limit, the probability of failure adapts based on Error! Reference source not found.

$$Pfd_{actual} = \text{Max}\left(Pdf_{design}, \min\left(1, \left(\frac{PV - AL}{NEL - AL}\right)\right), \text{Disabled}\right) \quad (2)$$

$$NEL = NL - S_{avg} \times TTR$$

In Equation 2, PV is the alarmed variable process value; AL is the alarm limit; NEL is the next effective protection system limit; NL is the next protection system limit (e.g. a trip or relief valve); S$_{avg}$ is the average rate-of-change of the PV; TTR is the average time for the PV to respond to operator compensating moves; and Disabled is a binary flag (1=disabled or 0=enabled) depending on whether the protective is disabled or active. The NEL value in Equation 2 accounts for the finite time response time of the process following the operator's corrective actions. Similarly, in Equation 2, the actual probability of failure on demand is dynamically adjusted based on the value of an alarmed variable (e.g., pressure measurement by pressure controller 324) as the alarmed variable progresses from its alarm limit to its next critical limit (e.g., SIF trip point). That is, the hazard risk increases contemporaneously with the deviation of the alarmed variable beyond the alarm limit based on a corresponding reduction of reaction time available to the operator to take corrective action to the audio/visual alarm. Note, the current probability of failure (Pfd$_{actual}$) of the safety instrument system 204c will be calculated using industry standard methods, but if industry standard methods are not available, then Equation 2 can be used to perform the calculation.

The estimate for the revised frequency of failure for the initiating cause is approximated as unity when the high pressure process deviation is detected. More particularly, Equation 2 can be used to estimate current probability of failure (Pfd$_{actual}$) during a failure of the pressure controller 324 in response to an initiating cause event 202a-202c, such that when the high pressure process deviation is detected 204a, the corresponding updated probability of failure 214a is approximated as unity (Pfd$_{actual}$=1).

As describe above, a current safety status of the operating plant can be displayed to the operator in an identical structure as the design LOPA scenario 200 of FIG. 2, yet the current/actual frequencies 230, 224, 212a-212c and current/actual probabilities 214a-214e, 220, 216 of failure are calculated based on the updated real-time or time-averaged information from blocks 470 and 475.

Although FIGS. 1 through 3 illustrate one example of industrial process control and automation system and related details, various changes may be made to FIGS. 1 through 3. For example, the functional division shown in FIG. 1 is for illustration only. Various components in FIG. 1 could be combined, further subdivided, or omitted and additional components could be added according to particular needs. In addition, while FIG. 4 illustrates a series of steps, various steps in each figure could overlap, occur in parallel, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method comprising:
   determining, by at least one processing device, at least one initiating cause that causes a hazard;
   determining, by the at least one processing device, an initiating cause frequency corresponding to the at least one initiating cause;
   determining, by the at least one processing device, a set of independent protection layers configured to operate to prevent the hazard and including at least one item of protection equipment;
   determining, by the at least one processing device, a failure probability of each independent protection layer;
   estimating, by the at least one processing device, a frequency of occurrence of the hazard using a product of the initiating cause frequency and a failure probability of the set of independent protection layers;
   controlling, by the at least one processing device, a display to present, in a fault tree format, the at least one initiating cause, the initiating cause frequency corresponding to the at least one initiating cause, the set of independent protection layers, the failure probability of each independent protection layer, and the frequency of occurrence of the hazard;
   receiving, by the at least one processing device, dynamic real-time information output from at least one controller or sensor used in controlling a manufacturing process that processes one or more product or other material at the plant, the dynamic real-time information from the at least one controller or sensor indicating a change in (i) the initiating cause frequency and (ii) at least one failure probability of at least one independent protection layer in the set of independent protection layers;
   adjusting, by the at least one processing device, the estimated frequency of occurrence of the hazard based on the dynamic real-time information; and
   automatically adjusting, by the at least one processing device, the display to present the adjusted estimated frequency of occurrence of the hazard.

2. The method of claim 1, wherein:
   the at least one initiating cause comprises a set of multiple initiating causes that are protected by the set of independent protection layers;
   the initiating cause frequency corresponding to the at least one initiating cause in the set of multiple initiating causes; and
   the method further comprises calculating the initiating cause frequency using a sum of the initiating cause frequencies corresponding to the initiating causes in the set of multiple initiating causes.

3. The method of claim 1, wherein the method further comprises calculating the failure probability of the set of independent protection layers using a product of the failure probabilities of the multiple set of independent protection layers.

4. The method of claim 1, further comprising:
   obtaining a set of hazards identified as a potential cause of damage at the plant;
   for each hazard in the set of identified hazards, estimating a frequency of occurrence of the associated hazard using a product of an initiating cause frequency that causes the associated hazard and a failure probability of a set of independent protection layers configured to operate to prevent the associated hazard; and
   calculating a total hazard rate using a sum of the frequencies of occurrence of all hazards in the set of identified hazards.

5. The method of claim 1, further comprising:
   adjusting the failure probability of at least one independent protection layer in the set of independent protection layers based on the dynamic real-time information,
   wherein the dynamic real-time information includes a current state of a device of the at least one independent protection layer.

6. The method of claim 1, further comprising:
   adjusting the failure probability of at least one independent protection layer in the set of independent protection layers based on time averaged information,
   wherein the averaged information includes an amount of time a device of the at least one independent protection layer is impaired during a monitoring period.

7. The method of claim 1, further comprising: selecting, as the initiating cause frequency, a greatest one of:
   a design event rate, an observed event rate, and
   a product of the design event rate and a weighted function of an asset equipment health index of a device corresponding to the at least one initiating cause.

8. An apparatus comprising:
   at least one processing device configured to:
   determine at least one initiating cause that causes a hazard at a plant,
   determine an initiating cause frequency corresponding to the at least one initiating cause;
   determine a set of independent protection layers at the plant, the independent protection layers configured to operate to prevent the hazard and including at least one item of protection equipment at the plant; determine a failure probability of each independent protection layer;
   estimate a frequency of occurrence of the hazard using a product of the initiating cause frequency and a failure probability of the set of independent protection layers;
   control a display to present, in a fault tree format, the at least one initiating cause, the initiating cause frequency corresponding to the at least one initiating cause, the set of independent protection layers, the failure probability of each independent protection layer, and the frequency of occurrence of the hazard;
   receive real-time information output from at least one controller or sensor used in controlling a manufacturing process that processes one or more product or other material at the plant, the real-time information from the at least one controller or sensor indicating a change in (i) the initiating cause frequency and (ii) at least one failure probability of at least one independent protection layer in the set of independent protection layers;
   adjust the estimated frequency of occurrence of the hazard based on the real-time information; and
   automatically adjust the display to present the adjusted estimated frequency of occurrence of the hazard.

9. The apparatus of claim 8, wherein:
   the at least one initiating cause comprises a set of multiple initiating causes that are protected by the set of independent protection layers;
   the initiating cause frequency corresponding to the at least one initiating cause comprises an initiating cause frequency corresponding to each initiating cause in the set of multiple initiating causes; and
   the at least one processing device is further configured to calculate the initiating cause frequency using a sum of the initiating cause frequencies corresponding to the initiating causes in the set of multiple initiating causes.

10. The apparatus of claim 8, wherein the at least one processing device is configured to calculate the failure probability of the set of independent protection layers using a product of the failure probabilities of the multiple set of independent protection layers.

11. The apparatus of claim 8, wherein the at least one processing device is further configured to:
   obtain a set of hazards identified as a potential cause of damage at the plant,
   for each hazard in the set of identified hazards, estimate a frequency of occurrence of the associated hazard using a product of an initiating cause frequency that causes the associated hazard and a failure probability of a set of independent protection layers configured to operate to prevent the associated hazard; and
   calculate a total hazard rate using a sum of the frequencies of occurrence of all hazards in the set of identified hazards.

12. The apparatus of claim 8, wherein the at least one processing device is further configured to:
   adjust the failure probability of at least one independent protection layer in the set of independent protection layers based on the real-time information,
   wherein the real-time information includes a current state of a device of the at least one independent protection layer.

13. The apparatus of claim 8, wherein the at least one processing device is further configured to:
   adjust the failure probability of at least one independent protection layer in the set of independent protection layers based on time averaged information,
   wherein the time averaged information includes an amount of time a device of the at least one independent protection layer is impaired during a monitoring period.

14. The apparatus of claim 8, wherein the at least one processing device is further configured to:
   select, as the initiating cause frequency, a greatest one of:
   a design event rate, an observed event rate, and
   a product of the design event rate and a weighted function of an asset equipment health index of a device corresponding to the at least one initiating cause.

15. A non-transitory computer readable medium embodying a computer program, the computer program comprising computer readable program code that, when executed by at least one processing device, causes the at least one processing device to:
   determine at least one initiating cause that causes a hazard at a plant; determine an initiating cause frequency corresponding to the at least one initiating cause; determine a set of independent protection layers at the plant, the independent protection layers configured to operate to prevent the hazard and including at least one item of protection equipment at the plant;
   determine a failure probability of each independent protection layer; estimate a frequency of occurrence of the hazard using a product of the initiating cause frequency and a failure probability of the set of independent protection layers;
   control a display to present, in a fault tree format, the at least one initiating cause, the set of independent protection layers, the failure probability of each independent protection layer, and the frequency of occurrence of the hazard;
   receive real-time information output from at least one controller or sensor used in controlling a manufacturing process that processes one or more product or other material at the plant, the real-time information from the at least one controller or sensor indicating a change in (i) the initiating cause frequency and (ii) at least one failure probability of at least one independent protection layer in the set of independent protection layers;
   adjust the estimated frequency of occurrence of the hazard based on the real-time information; and
   automatically adjust the display to present the adjusted estimated frequency of occurrence of the hazard.

16. The non-transitory computer readable medium of claim 15, wherein:
   the at least one initiating cause comprises a set of multiple initiating causes that are protected by the set of independent protection layers;

the initiating cause frequency corresponding to the at least one initiating cause comprises an initiating cause frequency corresponding to each initiating cause in the set of multiple initiating causes; and the computer program further comprises computer readable program code that, when executed by the at least one processing device, causes the at least one processing device to calculate the initiating cause frequency using a sum of the initiating cause frequencies corresponding to the initiating causes in the set of multiple initiating causes.

17. The non-transitory computer readable medium of claim 15, wherein the computer program further comprises computer readable program code that, when executed by the at least one processing device, causes the at least one processing device to calculate the failure probability of the set of independent protection layers.

18. The non-transitory computer readable medium of claim 15, wherein the computer program further comprises computer readable program code that, when executed by the at least one processing device, causes the at least one processing device to:
- obtain a set of hazards identified as a potential cause of damage at the plant;
- for each hazard in the set of identified hazards, estimate a frequency of occurrence of the associated hazard using a product of an initiating cause frequency that causes the associated hazard and a failure probability of a set of independent protection layers configured to operate to prevent the associated hazard; and
- calculate a total hazard rate using a sum of the frequencies of occurrence of all hazards in the set of identified hazards.

19. The non-transitory computer readable medium of claim 15, wherein the computer program further comprises computer readable program code that, when executed by the at least one processing device, causes that at least one processing device to:
- adjust the failure probability of at least one independent protection layer in the set of independent protection layers based on at least one of: the real-time information and time averaged information,
- wherein the real-time information includes a current state of a device of the at least one independent protection layer, and
- wherein the time averaged information includes an amount of time a device of the at least one independent protection layer is impaired during a monitoring period.

20. The non-transitory computer readable medium of claim 15, wherein the computer program further comprises computer readable program code that, when executed by the at least one processing device, causes the at least one processing device to: select, as the initiating cause frequency, a greatest one of: a design event rate, an observed event rate, and
- a product of the design event rate and a weighted function of an asset equipment health index of a device corresponding to the at least one initiating cause.

* * * * *